Figure 1:
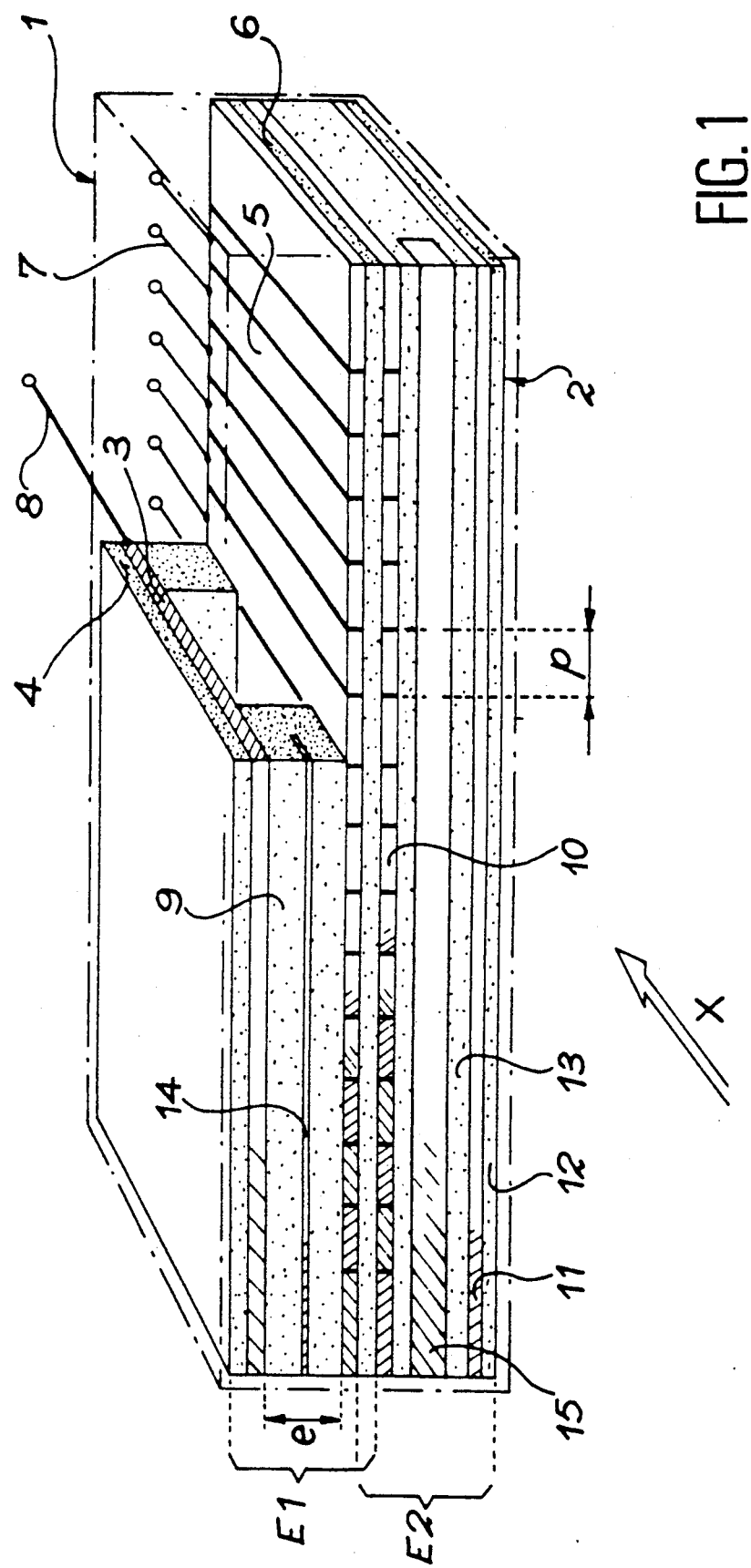

United States Patent [19]

Allemand et al.

[11] Patent Number: 5,018,175
[45] Date of Patent: May 21, 1991

[54] DETECTION ARRAY FOR IONIZING RADIATION TOMOGRAPHY

[75] Inventors: Robert Allemand, Saint Ismier; Martine Drouet, Pierrefitte; Gaétan Pleyber, Domene; Edmond Tournier, Grenoble, all of France

[73] Assignee: Commissariat A L'Energie Atomique, Paris, France

[21] Appl. No.: 323,885

[22] Filed: Mar. 15, 1989

[30] Foreign Application Priority Data

Mar. 23, 1988 [FR] France ................... 88 03796

[51] Int. Cl.$^5$ .............................................. H01J 47/02
[52] U.S. Cl. ........................................ 378/19; 378/4; 250/385.1
[58] Field of Search ................... 378/19, 4, 62; 250/385.1

[56] References Cited

U.S. PATENT DOCUMENTS 4,047,039  9/1977  Houston .
4,469,947  9/1984  Allemand et al. ........... 250/385.1
4,559,639 12/1985  Glover et al. .

FOREIGN PATENT DOCUMENTS 0063083 10/1982 European Pat. Off. .

Primary Examiner—Carolyn E. Fields
Assistant Examiner—David P. Porta
Attorney, Agent, or Firm—Pearne, Gordon, McCoy & Granger

[57] ABSTRACT

A detection array for ionizing radiation tomography for obtaining the image of at least one section of an object or organ. The array has at least one chamber (1) provided with a radiation-transparent entrance window (2) and in the chamber a detection stack (E1) incorporating a conductive polarizing plate (3) parallel to the sectional plane and a series of identical electrodes (5) parallel to the sectional plane. An insulating spacer (9) is placed between the electrodes (2) and the plate (5) and has, facing the window, at least one radiation-opaque intermediate plate (14) parallel to the sectional plane. This intermediate plate (14), the electrodes (5) and the polarizing plate (3) are disturbing elements which, separated by a distance d, make it possible to eliminate the artefacts for linear or quasi-linear inclusions in the object.

3 Claims, 3 Drawing Sheets

DETECTION ARRAY FOR IONIZING RADIATION TOMOGRAPHY

DESCRIPTION

The present invention relates to a detection array for ionizing radiation tomography, such as X-rays.

The invention applies to obtaining images of sections of an object or organ and in particular images in which disturbances due to the electrodes and to the polarizing plates used are eliminated. The detection array according to the invention can be used in radiography, which is a simplified case of tomography.

An X-ray tomography detection array is known of the type described e.g. in French Pat. No. 2 504 278, filed on Apr. 15th 1981 in the name of the same Applicant.

This detection array makes it possible to obtain the image of at least one section of an object or organ by detecting the X-rays which have passed through the object or organ in at least one sectional plane. It has at least one tight chamber containing an ionizable gas, said chamber being provided with an entrance window or port transparent to the X-rays from the object or organ. The interior of the chamber contains at least one detection stack comprising a planar conductive polarizing plate placed on an insulating support parallel to the sectional plane and a series of conductive, planar electrodes, which are identical and insulated from one another, being placed on a planar insulating support parallel to the sectional plane. These electrodes extend in a longitudinal direction towards the object. An X-ray transparent insulating spacer is placed between the plate and the electrodes and has a front part facing the window. Each volume between each electrode and a surface portion of the polarizing plate facing said electrode defines a detection cell. This cell is characterized by its spacing or pitch p close to the width of the electrode in a plane perpendicular to the longitudinal direction and by its height e equal to the distance separating the plane of the electrodes and the polarizing plate.

Connections make it possible to connect the electrodes to a first potential (e.g. reference earth), via means for measuring the currents flowing in said electrodes during the ionization of the gas by X-rays in the detection cells. Another connection makes it possible to connect the plate to a high voltage source, e.g. a positive voltage source.

The image of each section obtained from the processing of signals supplied by the detection array described in the aforementioned patent is of relatively good quality, but suffers from imperfections or artefacts due to disturbances to the ionization of the gas on the electrodes and the polarizing plate and in the vicinity thereof. An artefact is a fictional detail of the image which can result either from the processing of the measuring signals from the detection array, or disturbing effects caused by the electrodes and polarizing plate in the ionization of the gas.

These artefacts are very annoying, particularly when the object or organ has inclusions, such as thin strips or tubes (e.g. corresponding to blood vessels) which are highly inclined with respect to the sectional plane. The detection array described in the aforementioned patent does not make it possible to eliminate the artefacts associated with such inclusions and particularly those resulting from disturbances in the ionization of the gas on the electrodes and the polarizing plates and in the vicinity thereof.

The object of the invention is to obviate these disadvantages and in particular to supply a detection array for ionizing radiation tomography making it possible to eliminate in the image of a section of an object or organ, the artefacts normally appearing when said object or organ contains inclusions which are highly inclined with respect to the sectional plane. As stated hereinbefore, these artefacts are due to disturbances to the ionization of the ionizable material on the electrodes and polarizing plates and in the vicinity thereof.

The invention specifically relates to a detection array for ionizing radiation tomography, for obtaining the image of at least one section of an object or organ by detecting the ionizing rays which have passed through the object or organ in at least one sectional plane comprising at least one detection stack having a planar conductive polarizing plate parallel to the sectional plane, a series of conductive, planar identical electrodes, which are insulated from one another and parallel to the sectional plane, said electrodes extending in a longitudinal direction towards the object and an ionizable material between the plate and the electrodes, each volume between each electrode and a surface portion of the polarizing plate facing said electrode defining a detection cell, said cell being defined by its pitch p close to the width of the electrode in a plane perpendicular to the longitudinal direction and by its height e equal to the distance separating the electrode and the polarizing plate, characterized in that for an object or organ having one or more inclusions with projections on the stack in a plane perpendicular to the longitudinal direction of the electrodes, said projections being linear or quasi-linear and inclined with respect to the plane of said electrodes, if $\alpha$ designates the smallest angle of inclination of these projections above which an artefact due to the disturbing elements of the stack must be eliminated, the disturbing elements incorporating at least the polarizing plate and the electrodes, if d designates the smallest distance separating two successive disturbing elements, the distance d is chosen as to be equal to or smaller than $2p \cdot \tan\alpha$, said choice avoiding the disturbing effects of said elements.

The ionizable material according to the invention can e.g. be a gas or solid of the semiconductor type.

According to another feature of the invention, the successive disturbing elements of the stack are associated with the polarizing plate and the electrodes, so that the distance d is equal to the height e between the electrodes and the polarizing plate.

According to an embodiment of the invention, the ionizable material is a gas, so that the stack is located in a tight chamber provided with an entrance window or port transparent to the ionizing radiation from the organ or object, the polarizing plate and electrodes being located on separate insulating supports, an insulating spacer transparent to the ionizing radiation being positioned between the plate and the electrodes, said spacer having at least one portion facing the window or port.

In this case, the disturbing element of the stack associated with the polarizing plate is constituted by said plate, the insulating support on which it is located and optionally the polarizing plate of the adjacent stack. In the same way, the disturbing element associated with the electrodes is constituted by said electrodes, the insulating support on which they are located and possibly the electrodes of the adjacent stack.

Advantageously, the spacer portion facing the window has at least one intermediate plate opaque to the ionizing rays parallel to the sectional plane, said plate forming part of the distrubing elements of the stack.

According to another feature of the invention, the disturbing elements of the stack have the same thickness.

According to another feature, the intermediate plate is located equidistantly of the electrodes and the polarizing plate.

According to another feature, the spacer portion facing the window has m intermediate plates opaque to the ionizing rays, parallel to the sectional plane, said plates forming part of the disturbing elements of the stack and subdivide the spacer into m+1 equal intervals, so that:

$$d = \frac{e}{m+1} \text{ and } \alpha m = \text{Arctan} \frac{e}{2p(m+1)},$$

$\alpha m$ designating the limit inclination angle above which the artefacts are eliminated when the spacer has m intermediate plates, the introduction of the m intermediate plates making it possible to reduce the appearance range of an artefact from the angular range $(0, \text{Arctan}(e/2p))$ to the angular range $(0, \text{Arctan}(e/2p(m+1)))$.

According to another feature, the electrodes and polarizing plate are respectively constituted by conductive deposits of a very limited thickness on the corresponding insulating supports.

According to another feature, the insulating supports of the electrodes and the plate are flexible, the chamber containing traction or pulling means for pulling said supports parallel to the sectional plane.

The features and advantages of the invention can be gathered from the following description relative to the drawings, wherein show:

FIG. 1 Diagrammatically and in perspective an example of a detection array according to the invention.

Figure 2:
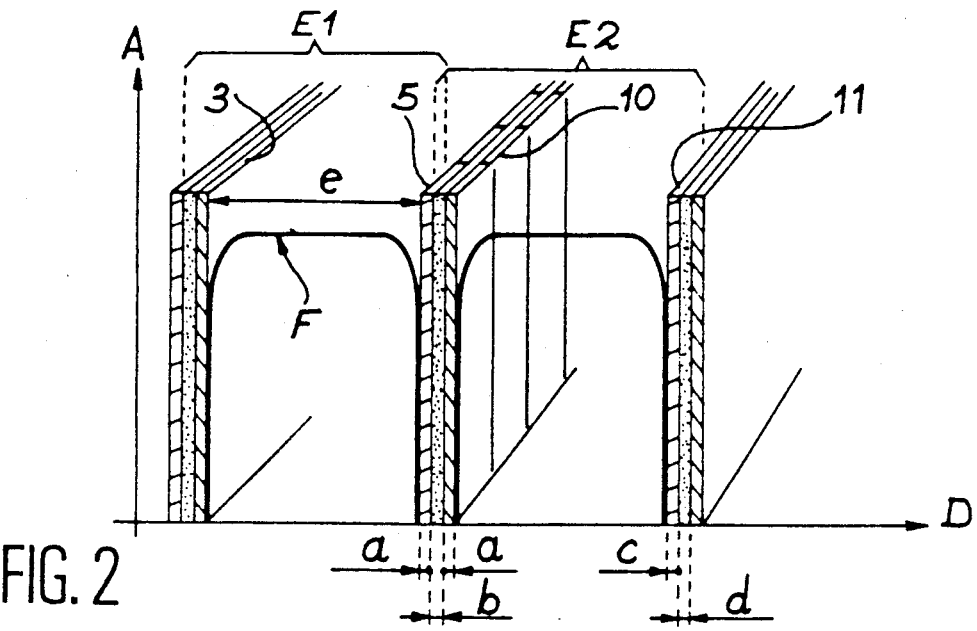

FIG. 2 A diagram representing the transverse sensitivity function of a detection array, as a function of the distance at which the ionization occurs, with respect to the electrodes and the polarizing plate.

Figure 3:
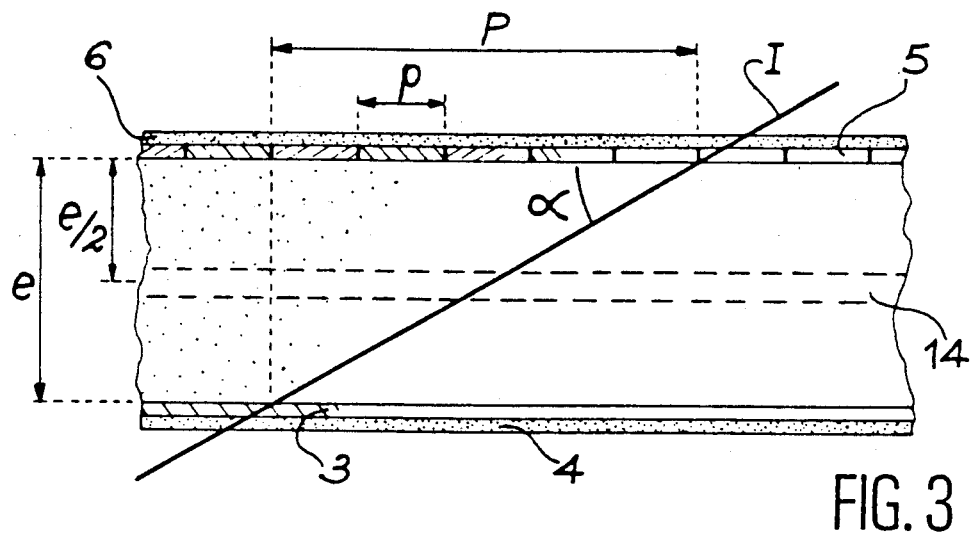

FIG. 3 Diagrammatically a detection array according to the invention seen from the side of its entrance window, making it possible to more easily understand the choice of spacing between the distrubing elements.

Figure 4:
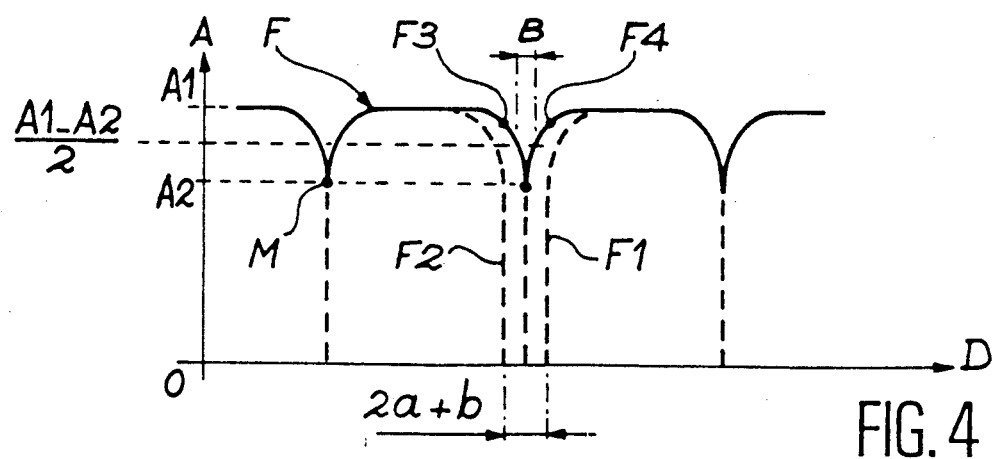

FIG. 4 A diagram showing the transverse sensitivity function for a detection array in which it is assumed that the thickness of the electrodes, the polarizing plate and the supports on which they are arranged is virtually zero.

Figure 5:
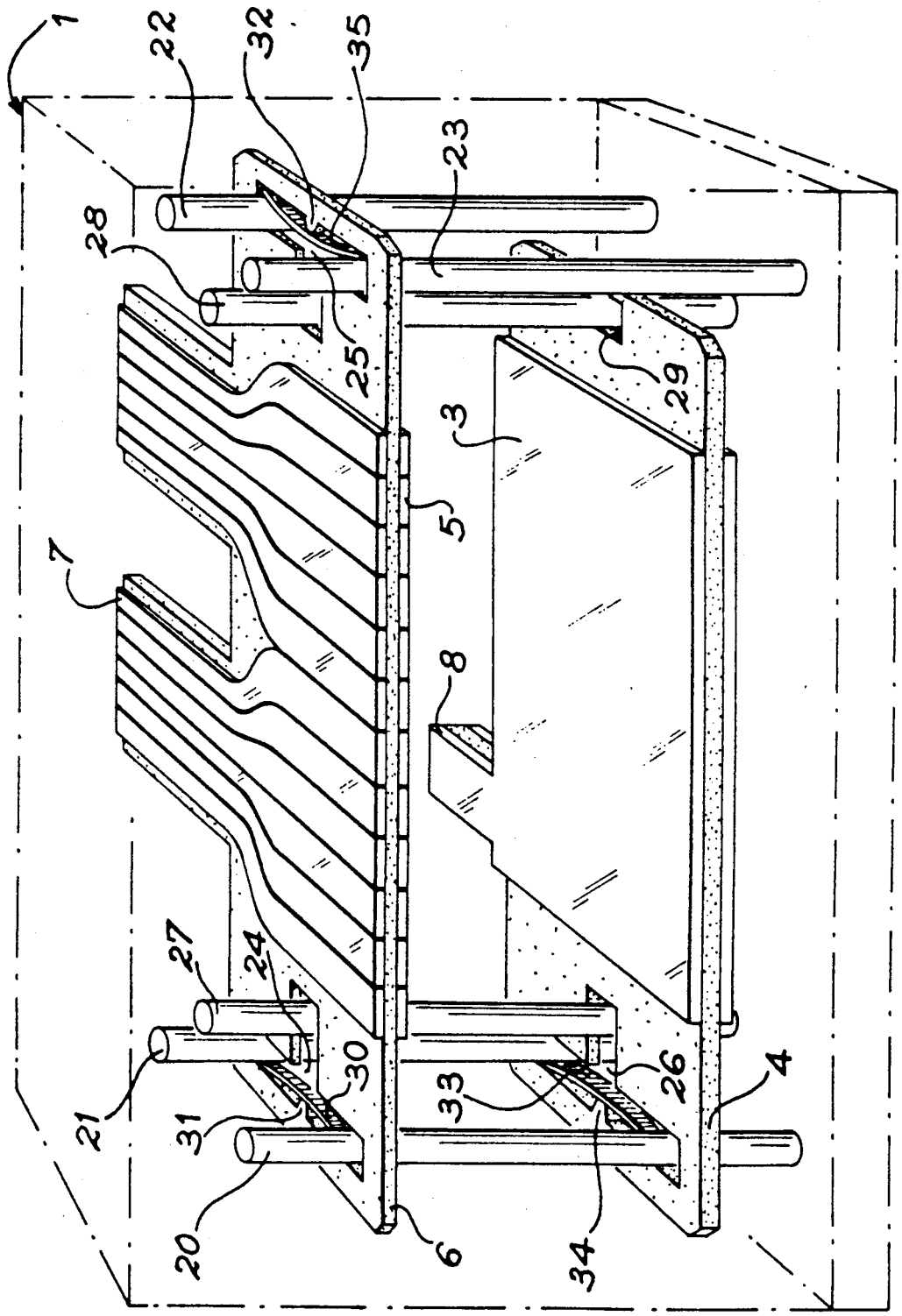

FIG. 5 Diagrammatically and in perspective certain of the means used in the detection array according to the invention for positioning the electrodes and the polarizing plates in the chamber.

The detection array shown diagrammatically, in perspective and in partial section in FIG. 1 makes it possible to obtain the image of at least one section of an object or organ by detecting the ionizing rays which have passed through said object or organ in a sectional plane. Throughout the remainder of the description, X-rays will be used as an example of ionizing rays.

This array has at least one tight chamber 1 containing an ionizable gas. It is provided with an entrance window or port 2 transparent to the X-rays from the object or organ. Chamber 1 and window 2 are not shown in detail in the drawing. The interior of chamber 1 has at least one detection stack E1 incorporating a planar conductive polarizing plate 3 located on an insulating support 4 parallel to the sectional plane.

The stack E1 also has a series of identical conductive, planar electrodes 5, which are insulated from one another and located on an insulating support 6 parallel to the sectional plane. These electrodes extend in a longitudinal direction towards the object. They can e.g. be formed by the deposition of copper on the insulating support 6 made from epoxy glass. The polarizing plate 3 can e.g. be formed by a copper deposit on the epoxy glass insulating support 4. Electrodes 5 are connected by connections 7 to a reference potential (preferably reference earth) via means for measuring the values of currents flowing in the electrodes and the polarizing plate 3 is connected by connection 8 to a d.c. voltage source, e.g. a positive voltage source and not shown in the drawing. Each stack forms a plurality of detection cells. A detection cell is defined by the volume between an electrode and a surface portion of the polarizing plate facing said electrode. During the ionization of the gas by X-rays in the detection cell, currents flow in electrodes 5 and are measured by not shown measuring means, which are themselves connected to not shown processing means, which process the measured values to obtain the image of the section of the organ or object on a display screen. These measuring and processing means do not form part of the present invention.

The stack E1 also has an X-ray-transparent insulating spacer 9 located between polarizing plate 3 and electrodes 5 and which is in the form of a frame.

Each detection cell is defined by its spacing or pitch p, which is substantially equal to the width of the electrode in a plane perpendicular to the longitudinal direction of said electrode. This cell is also defined by its height e, which is equal to the distance separating the electrode from the polarizing plate 3. The drawing also shows a stack E2, similar to stack E1 and having electrodes 10 arranged on another face of the insulating support 6, a polarizing plate 11 deposited on an insulating support 12 and an insulating spacer 13.

According to the invention and for reasons which will be described hereinafter, the spacer portion of each stack facing window 2 advantageously has at least one intermediate, planar, X-ray-opaque plate parallel to the sectional plane. This opaque plate can e.g. be a copper plate 14 inserted in the spacer 9. An intermediate plate 15 is also inserted in spacer 13 of stack E2. As will be shown hereinafter, said intermediate plate makes it possible to eliminate the artefacts for inclination angles equal to or greater than arctan(d/2p).

FIG. 2 provides better understanding of the disturbances to the ionization of the gas due to the electrodes and the polarizing plate. It is in the form of a diagram F giving the variations of the amplitude A of the current which can be collected on each electrode, as a function of the distance D at which the ionization of the gas occurs, with respect to the considered electrode and the polarizing plate in each of the stacks E1, E2. These stacks are shown diagrammatically and in perspective in the drawing in order to facilitate understanding. The function represented by diagram F can be qualified as a transverse sensitivity function of the detection array. It can be seen that the sensitivity or amplitude A of the current supplied by an electrode 5 or 10 increases when the ionization occurs remotely from the electrode or corresponding polarizing plate 3 or 11. This amplitude decreases when the ionization occurs in the vicinity of each electrode or polarizing plate. It is zero when the ionization occurs on an electrode or polarizing plate.

There is a significant sensitivity loss of the detection array when the ionization of the molecules of gas by the X-rays from the object occurs on electrodes and polarization plates or in the vicinity thereof. This disturbance due to the electrodes and the polarizing plates causes disturbances or artefacts, as indicated hereinbefore, in the sectional image of the object obtained after the processing of the values of the currents measured for the different electrodes. These artefacts due to the electrodes and polarizing plates are very significant when the object or organ whereof it is wished to obtain the image of a section, contains strips or tubes or, in general terms, inclusions, whose projections on a plane perpendicular to the longitudinal direction of the electrodes can assume a linear or quasi-linear form highly inclined with respect to the sectional plane. The drawing also makes it clear that the significance of the disturbance of the transverse sensitivity function of the detection array is increased by the respective thicknesses a and c of the electrodes and polarizing plates, as well as by the respective thicknesses b and d of the insulating supports of said electrodes and plates.

FIG. 3 makes it easier to understand the choice made, according to the invention, in the spacing e between the polarizing plate 3 and the measuring electrodes 5 of a detection stack relative to the pitch p of each detection cell. This choice makes it possible to avoid the appearance of artefacts in the image of a section of an object or organ, when the latter has inclusions of linear or quasi-linear projections highly inclined with respect to the sectional plane.

The drawing diagrammatically shows in cross-section a detection array, in which a straight line I represents the projection of a plane passing through a planar or quasi-planar inclusion contained in an object, said plane being assumed as perpendicular to the front face of the detector, which is perpendicular to the sectional plane. Line I is in fact the projection on the plane perpendicular to the sectional plane and perpendicular to the longitudinal direction of the electrodes of the inclusion contained in the object or organ to be studied. The reference $\alpha$ is used to designate the inclination or slope of line I relative to the plane of the electrodes 5, i.e. relative to the sectional plane.

Each clearance by line I of a disturbing element of the stack corresponds to an image defect. When the disturbing elements e.g. correspond solely to those associated with electrodes 5 and polarizing plate 3, the image of the planar or quasi-planar inclusion corresponding thereto has two defects, which are the artefacts respectively due to the electrode and the polarizing plate. These defects e.g. lead in the case of a strip to lines and in the case of a tube to contractions. The spacing P between the projections on a plane parallel to the sectional plane of the intersections of line I with the electrodes and polarizing plate is equal to $e/\tan\alpha$. The number of detection cells of pitch p participating in the formation of the image of the inclusion for the considered stack is equal to n, so that P is close to n.p.

The drawing shows that $e = P \cdot \tan\alpha$ and from it is deduced $\alpha = \text{Arctan}(e/P)$. An experimental study shows that for a planar or quasi-planar inclusion, the artefacts in the image of said inclusions due to the disturbing elements associated with the electrodes and polarizing plate only appear if the projection I of these inclusions is inclined relative to the sectional plane by an angle $\alpha$ less than Arctan $e/2p$, which corresponds to saying that the artefact does not occur when $\alpha > $ Arctan $e/2p$ or $e \leq 2p \cdot \text{tg}\alpha$.

Thus, for a detection array, whereof the electrodes and polarizing plate are spaced by a distance e, it is possible to reduce the appearance range of artefacts by providing one or more supplementary disturbing elements, such as the intermediate plates, which subdivide the space between electrodes 5 and plate 3 into equal intervals. These disturbing elements are intermediate plates, which are opaque to ionizing rays and parallel to the sectional plane, located in the insulating spacer 9 facing the entrance window.

According to an embodiment, a single intermediate plate 14 (cf. FIG. 1) is located equidistantly between electrodes 5 and polarizing plate 3. A single intermediate plate 4 is also shown in broken line form in FIG. 3.

On using m intermediate plates, said plates divide the space between electrodes 5 and plate 3 into $m+1$ equal intervals. For the artefacts due to the disturbing elements (plate-electrodes-intermediate plates) not to appear, it is necessary for the inclination angle of the projection of an inclusion to be equal to or greater than an angle:

$$\alpha m = \text{Arctan} \frac{e}{2p(m+1)} \text{ with } d = (e/m + 1)$$

Without an intermediate plate, the inclination angle would have to be equal to or greater than:

$$\alpha O = \text{Arctan} \frac{e}{22p} \text{ with } d = e$$

The relation $\alpha m < \alpha O$ shows the advantage brought about through the use of intermediate plates, d representing the distance of two successive disturbing elements and $\alpha m, \alpha O$ the limit inclination angles.

FIG. 4 provides a better understanding of the importance of the choice of a very small thickness for the electrodes and polarizing plates in the detection array. It shows the transverse sensitivity function of two detection stacks, for which it is assumed that the electrodes, polarizing plates and supports on which they are located have a virtually zero thickness. It can be seen that in this case the amplitude A of the transverse function F varies between a maximum amplitude A1 and a minimum amplitude A2. In the case where the electrodes and their insulating support have a thickness equal to $2a+b$, the transverse function, as shown by the broken lines F1, F2, has a zero amplitude minimum. Thus, the thicker the electrodes or polarizing plate, the greater the disturbances of the transverse function leading to significant artefacts in the image of a section of an object. It is therefore indispensable to choose thicknesses for the electrodes, polarizing plates and supports for the electrodes and plates, which are as small as possible. Experience shows that said thickness can be close to the distance B. The latter is in fact the distance separating portions F3, F4 of transverse function F in the vicinity of electrodes or polarizing plates with a quasi-zero thickness for an amplitude $(A1-A2)/2$ close to half the amplitude difference between A1 of the transverse function and the minimum A2 thereof. In practice, the thickness of the electrodes, polarizing plates and insulating supports for the same is a few tenths of a millimeter. The insulating supports are advantageously made from epoxy glass, whilst the polarizing plates and electrodes are constituted by copper deposits on said insulating supports, e.g. using printed circuit technology.

FIG. 5 diagrammatically shows in perspective a detection stack according to the invention within the ionization chamber 1. The same elements carry the same references here and in FIG. 1. The insulating spacer and intermediate plate are not shown.

As stated hereinbefore, electrodes 5 and polarizing plate 3 are respectively constituted by copper deposits on epoxy glass flexible insulating supports 6, 4. FIG. 5 also shows bands 7, 8 for connecting the electrodes and the polarizing plate to the power supplies and measuring means outside 1. The electrodes and polarizing plate, as well as their respective supports have a very limited thickness. The obtaining of a good image quality of a section requires a strict planeity of the supports of the electrodes and polarizing plates.

Thus, according to the invention, means are provided within the ionization chamber 1 for stretching the supports 6, 4 parallel to the sectional plane. These means are e.g. constituted by pins 20, 21, 22, 23 integral with chamber 1 and passing through openings 24, 25 of the electrode support 6 and an opening 26 of the support 4 for the polarizing plate 3. Centring pins 27, 28 respectively pass through the openings 24, 25 of support 6 of electrodes 5. These centring pins also respectively pass through the opening 26 of support 4 of plate 3 and an opening 29 in said support. The fixing pins 20, 21, 22, 23 of insulating support 6 cooperate with an elastic strip 30, on which bears a tongue 31 of opening 24 to bring about a mechanical traction or pull on support 6. In the same way, an elastic strip 35 brings about a traction effect on support 6 by bearing on pins 22, 23 and on tongue 32.

An elastic strip 33 causes the traction of support 4 by bearing on pins 20, 21 and on tongue 34. For support 4 of plate 3, it is not necessary to carry out an opposite traction or pull with the aid of pins 22, 23 and centring pin 28 passing through opening 29 of support 4 also serves to maintain said support in position.

The opposite tractions of support 6 make it possible to centre the electrodes in the detection array. This centring is unnecessary for the polarizing plate, whereby support 4 can be positioned both by a single traction and by a double traction like that of support 6.

What is claimed is:

1. Detection array for ionizing radiation tomography, for obtaining an image of at least one section of an object or organ by detecting ionizing rays which have passed through the object or organ in at least one sectional plane comprising at least one detection stack (E1) having a planar conductive polarizing plate (3) parallel to the sectional plane, a series of conductive, planar identical electrodes (5), which are insulated from one another and parallel to the sectional plane, said electrodes extending in a longitudinal direction towards the object and an ionizable material between the plate (3) and the electrodes (5), each volume between each electrode (5) and a surface portion of the polarizing plate (3) facing said electrode defining a detection cell, said cell being defined by its pitch p essentially equal to the width of the electrode in a plane perpendicular to the longitudinal direction and by its height e equal to the distance separating the electrode and the polarizing plate, the object or organ having one or more inclusions with projections on the stack in a plane perpendicular to the longitudinal direction of the electrodes, said projections being linear or quasi-linear and inclined with respect to the plane of said electrodes, the smallest distance d separating two disturbing elements incorporating at least the polarizing plate and the electrodes is equal or smaller than 2p·tan$\alpha$, $\alpha$ designating the smallest angle of inclination of these projections above which an artefact due to the disturbing elements of the stack must be eliminated, so to avoid the disturbing effects of said elements, wherein the ionizable material is a gas, so that the stack is located in a tight chamber provided with an entrance window or port transparent to the ionizing radiation from the organ or object, the polarizing plate (3) and electrodes (5) being located on separate insulating supports (4, 6), an insulating spacer (9) transparent to the ionizing radiation being positioned between the plate (3) and the electrodes (5), said spacer having at least one portion facing the window or port (2) and the portion of said spacer facing window (2) has at least one intermediate plate (14) opaque to the ionizing rays, parallel to the sectional plane, said plate belonging to said stack disturbing elements.

2. Array according to claim 1, characterized in that the intermediate plate (14) is positioned equidistantly of the electrodes (5) and polarizing plate (3).

3. Array according to claim 1, characterized in that the spacer (9) facing the window (2) has m intermediate plates opaque to the ionizing rays, parallel to the sectional plane, said plates forming part of the disturbing elements of the stack and subdividing the spacer into m+1 equal intervals, so that:

$$d = \frac{e}{m+1} \text{ and } \alpha m = \text{Arctan} \frac{e}{2p(m+1)},$$

$\alpha m$ designating the limit inclination angle above which the artefacts are eliminated when the spacer has m intermediate plates, the introduction of the m intermediate plates making it possible to reduce the appearance range of an artefact from the angular range (0Arctan(e/2p)) to the angular range (0,Arctan(e/2p(m+1))).

* * * * *